United States Patent [19]
Gordon et al.

[11] 3,799,999
[45] Mar. 26, 1974

[54] SYNTHESIS OF PRIMARY ALKYL HALIDES

[75] Inventors: Ronnie D. Gordon, Richardson, Tex.; Charles M. Starks, Ponca City, Okla.

[73] Assignee: Continental Oil Company, Ponca City, Okla.

[22] Filed: Mar. 10, 1972

[21] Appl. No.: 233,768

Related U.S. Application Data
[63] Continuation-in-part of Ser. No. 75,286, Sept. 24, 1970.

[52] U.S. Cl. ............................................. 260/658 R
[51] Int. Cl. .............................................. C07c 17/20
[58] Field of Search ................................. 260/658 R

[56] References Cited
UNITED STATES PATENTS
3,410,917  11/1968  Louw .............................. 260/658 R
3,577,471  5/1971  McNulty et al. ................ 260/658 R

OTHER PUBLICATIONS
Calingaert et al., JACS 62, pp. 1,545–1,547 (1940) QD 1A5.

Primary Examiner—Leon Zitver
Assistant Examiner—Joseph A. Boska
Attorney, Agent, or Firm—Ronald J. Carlson

[57] ABSTRACT

Primary alkyl halides are reacted with ethyl halides to interchange the halide groups, the reaction being conducted in the presence of a catalyst comprising alkali metal or alkaline earth metal halides in an aprotic solvent.

8 Claims, No Drawings

SYNTHESIS OF PRIMARY ALKYL HALIDES

This application is a continuation-in-part of application Ser. No. 75,286, filed Sept. 24, 1970.

This invention relates to the preparation of primary alkyl halides, and more particularly, to the synthesis of primary alkyl chlorides, bromides and iodides utilizing different reactants and catalyst systems than heretofore proposed.

Various methods have heretofore been proposed for preparing primary alkyl halides. 1-olefinic feedstocks are readily available source materials for preparing primary alkyl halides. Primary alkyl bromides can be synthesized by direct addition of HBr to such olefins. However, the direct addition of hydrogen chloride to such olefins yields mainly secondary alkyl chlorides. More frequently, primary alkyl chlorides have been synthesized by initially preparing primary alkyl bromides and then reacting the primary alkyl bromides with any one of several types of chloride containing compounds to effect the exchange of the chloride and bromide ions. An example of a process of the type described is that which is disclosed in U.S. Pat. No. 3,410,917 to Louw. In Louw's process, after the primary alkyl bromide has been prepared from HBr and the 1-olefin, it is reacted with hydrogen chloride in an aprotic solvent to yield the primary alkyl chloride. Some bromide salts may be placed in the aprotic solvent solely for the purpose of facilitating recovery of the by-product hydrogen bromide.

The present invention constitutes a new synthesis of primary alkyl halides, said halides being selected from bromides, iodides and chlorides, by an interchange reaction. Broadly described, the process utilized comprises reacting a primary alkyl halide of the formula RX (R is alkyl and X is bromine, iodine or chlorine) with an ethyl halide of the formula $CH_3CH_2Y$ (Y is bromine, iodine or chlorine), wherein X and Y are different halides, in the presence of a catalyst consisting essentially of alkali and alkaline earth metal chlorides, bromides or iodides, in an aprotic solvent.

An object of the invention is to provide a new method for synthesizing primary alkyl halides using a metal halide salt in an aprotic solvent as a catalyst.

Another object of the invention is to provide a method for preparing primary alkyl chlorides from readily available bromide compounds with no substantial material loss resulting in the process.

Other objects and advantages of the invention will become apparent from the following detailed description of preferred embodiments of the invention.

In the synthesis of primary alkyl halides in accordance with the interchange process of the invention, the reactant materials employed are a primary alkyl halide of the formula RX, wherein R is an alkyl group and X is bromine, chlorine or iodine, and an ethyl halide of the formula $CH_3CH_2Y$, wherein Y is bromine, chlorine or iodine, provided that X and Y are different halides. The alkyl group represented by R corresponds, of course, to the alkyl group of the primary alkyl halide desired to be produced. The process is particularly applicable to those compounds wherein the alkyl group contains from 1 to about 50 carbon atoms, although there is nothing critical with respect to chain length and compounds having longer chain alkyl groups can also be employed.

The two above-described reactant materials are reacted in the presence of a catalyst comprising certain metal halide salts in an aprotic solvent to yield a primary alkyl halide of the formula RY and an ethyl halide of the formula $CH_3CH_2X$ by exchange of the X and Y ions.

In the specific case wherein a primary alkyl bromide is reacted with ethyl chloride there is produced a primary alkyl chloride by exchange of the bromide and chloride ions. The ethyl bromide which is produced as a side product can be pyrolyzed to produce hydrogen bromide and ethylene, the recovery of which can be accomplished through known techniques.

The metal halide salts useful as catalysts in conjunction with the aprotic solvents include the alkali and alkaline earth metal chlorides, bromides and iodides. Alkali metal chlorides and bromides constitute the preferred salts of the catalyst system, particularly those derived from potassium sodium and lithium. Some examples of suitable salts include sodium chloride, sodium bromide, sodium iodide, potassium chloride, potassium bromide, potassium iodide, lithium chloride, lithium bromide, lithium iodide, calcium chloride, calcium bromide, barium chloride, barium bromide, etc.

A wide variety of aprotic solvents can be used in making up the catalyst system. In general, alkaline aprotic dipolar solvents are suitable, particularly those having dipole moments of at least 2.5 D. Included within this group are aprotic solvents having a $pK_a$ at least equal to $-1$. Particularly suitable solvents are N,N-dimethyl formamide; N,N-diethyl formamide; N,N-dimethyl acetamide; N-methyl-N-ethyl acetamide; N,N-diethyl acetamide; N-methyl pyrrolidone; sulfolane; dimethyl sulfoxide; acetonitrile; hexamethyl phosphoramide; N,N,N', N'-tetramethyl urea; N,N,N',N'-tetramethyl thiourea.

The amount of aprotic solvent employed in carrying out the synthesis may vary widely over a range of from about 0.01 percent by volume to about 10.0 percent by volume based on the total volume of the reactants, i.e., ethyl chloride and the desired primary alkyl bromide. Preferably, the amount of aprotic solvent employed is from about 0.01 to about 0.1 percent by volume of the total volume of the reactants.

A catalytic amount of the metal halide salt is employed in the process. Most frequently it will be found that the quantity employed will range from about 0.01 gram per 100 ml. of solvent up to about 10 grams per 100 ml. of solvent, although the maximum amount utilized is generally not critical. Preferably, about 0.05 mol of the salt is utilized per mol of the ethyl halide reactant.

In carrying out the reaction, the ethyl halide and primary alkyl halide reactants are heated in the presence of the catalyst to a temperature of from about 80° C. to about 300° C. for a period of from about 5 hours to about 20 hours, depending upon the temperature of decomposition of the aprotic solvent, and the reaction rate desired.

The following examples will further demonstrate the synthesis of various primary alkyl halides using the process of the present invention.

EXAMPLE 1

0.03 gram of sodium bromide was dissolved in 5 ml. of N,N-dimethyl formamide at 30° C., and this catalyst system was then added to 25.8 grams (0.4 mol) of ethyl chloride and 54.8 grams (0.4 mol) of 1-bromobutane in a 100 ml. autoclave. The autoclave was sealed and heated to 110° C. for 16 hours.

Analysis by gas chromatography of the reaction product revealed four components of the mixture. These were ethyl chloride, ethyl bromide, 1-bromobutane and the desired 1-chlorobutane, with each of the components being produced in substantially equal molar amounts.

The 1-chlorobutane was recovered from the reaction mixture by distillation. The ethyl bromide component of the reaction mixture was isolated and pyrolyzed to ethylene and hydrogen bromide. The ethyl chloride and 1-bromoethane were recovered for reuse in the reaction.

EXAMPLE 2

0.1 gram of sodium bromide was dissolved in 20 ml. of N-methyl pyrrolidone and this catalyst solution was added to a 100 ml. autoclave containing 54.8 grams (0.4 mol) of 1-bromobutane and 25.8 grams (0.4 mol) of ethyl chloride. The autoclave was sealed and heated to 110° C. for 16 hours. The contents of the autoclave were then analyzed by gas chromatography, and four products were found to be present. These products and the weight percent of each present were as follows: ethyl chloride (76.2 percent), ethyl bromide (23.8 percent), 1-bromobutane (70.6 percent), and 1-chlorobutane (29.4 percent). The four product compounds were separated and worked up as described in Example 1.

EXAMPLE 3

0.1 gram of sodium bromide was dissolved in 20 ml. of dimethyl sulfoxide at 40° C. and the solution added to a 100 ml. autoclave containing 25.8 grams (0.4 mol) of ethyl chloride and 54.8 grams (0.4 mol) of 1-bromobutane. The autoclave was sealed and heated to 90° C. for a 6-hour period. The contents of the autoclave were then analyzed by gas chromatography. The reaction mixture consisted of 63.4 percent ethyl chloride, 36.6 percent ethyl bromide, 56.8 percent 1-bromobutane, and 43.2 percent chlorobutane. The products were separated and worked up as described in Examples 1 and 2.

EXAMPLE 4

Following the procedure set forth in Example 3, similar results are achieved when employing the following reaction systems:

TABLE

| Primary Alkyl Halide | Ethyl Halide | Metal Halide Salt | Aprotic Solvent |
| --- | --- | --- | --- |
| Propyl bromide | Ethyl chloride | KCl | N,N-dimethyl acetamide |
| Propyl chloride | Ethyl iodide | LiCl | hexamethyl phosphoramide |
| Octyl chloride | Ethyl bromide | BaCl$_2$ | acetonitrile |
| Octyl iodide | Ethyl bromide | NaCl | N,N,N',N'-tetramethyl urea |
| Decyl bromide | Ethyl iodide | KI | sulfolane |
| Hexyl bromide | Ethyl chloride | LiBr | N,N-diethyl acetamide |

TABLE-Continued

| Primary Alkyl Halide | Ethyl Halide | Metal Halide Salt | Aprotic Solvent |
| --- | --- | --- | --- |
| Hexyl iodide | Ethyl chloride | CaCl$_2$ | hexamethyl phosphoramide |
| Dodecyl chloride | Ethyl bromide | NaCl | acetonitrile |
| Heptadecyl chloride | Ethyl iodide | KBr | N,N,N',N'-tetramethyl thiourea |
| Dodecyl bromide | Ethyl iodide | BaCl$_2$ | dimethyl sulfoxide |
| Eicosyl iodide | Ethyl chloride | LiCl | sulfolane |
| Docosyl bromide | Ethyl chloride | KI | N,N-dimethyl acetamide |
| Eicosyl chloride | Ethyl bromide | NaCl | N,N-dimethyl formamide |
| Hexacosyl bromide | Ethyl iodide | NaBr | N-methyl,N-ethyl acetamide |
| Heptadecyl iodide | Ethyl chloride | CaCl$_2$ | acetonitrile |
| Hexacosyl chloride | Ethyl bromide | NaI | hexamethyl phosphoramide |

Although certain preferred embodiments of the invention have been herein described in order to exemplify the manner in which the invention may be practiced, it is to be understood that various changes and modifications may be effected in the amounts of reactants and catalysts utilized, and in the temperatures and time periods which are employed, in the carrying out of the process. Variations and changes which continue to rely upon the basic principles of the invention are therefore considered to be circumscribed by the spirit and scope of the invention except as the same may be necessarily limited by the appended claims or reasonable equivalents thereof.

What is claimed is:

1. The method of preparing a primary alkyl halide which comprises reacting a primary alkyl halide of the formula RX, wherein R is an alkyl group and X is bromine, chlorine or iodine, with an ethyl halide of the formula CH$_3$CH$_2$Y, wherein Y is bromine, chlorine or iodine, X and Y being different from each other, said reaction being conducted at temperatures of from about 80° C to about 300° C in the presence of a catalyst comprising a metal halide salt in a dipolar aprotic solvent selected from the group consisting of acetonitrile, N,N-dimethyl formamide, N-methyl pyrrolidone, N,N-diethyl formamide, dimethyl sulfoxide, N,N-dimethyl acetamide, N,N-diethyl acetamide, N-methyl-N-ethyl acetamide, sulfolane, hexamethyl phosphoramide, N,N,N'N'-tetramethyl urea and N,N,N'N'-tetramethyl thiourea, the metal halide salt being an alkali metal or alkaline earth metal halide wherein the halide is bromine, chlorine or iodine.

2. The method according to claim 1 wherein X is bromine and Y is chlorine or iodine.

3. The method according to claim 1 wherein X is chlorine and Y is bromine or iodine.

4. The method according to claim 1 wherein X is iodine and Y is bromine or chlorine.

5. The method according to claim 1 wherein X is bromine and Y is chlorine.

6. The method defined in claim 5 wherein said metal halide salt is an alkali metal bromide or chloride.

7. The method defined in claim 1 wherein the amount of aprotic solvent employed in carrying out the reaction varies over a range of from about 0.01 percent by volume to about 10 percent by volume based on the total volume of the reactants.

8. The method defined in claim 7 wherein the concentration of the metal halide salt in the aprotic solvent ranges from about 0.01 gram of salt per 100 ml. of solvent up to about 10 grams per 100 ml. of solvent.

* * * * *